(12) United States Patent
Ogawa et al.

(10) Patent No.: US 10,173,374 B2
(45) Date of Patent: Jan. 8, 2019

(54) THREE-DIMENSIONAL PRINTING DEVICE

(71) Applicant: Roland DG Corporation, Hamamatsu-shi, Shizuoka (JP)

(72) Inventors: Youichirou Ogawa, Hamamatsu (JP); Hiromu Ichikawa, Hamamatsu (JP); Kazutoshi Funakoshi, Hamamatsu (JP); Toru Matsumura, Hamamatsu (JP); Kazuhito Miyamoto, Hamamatsu (JP)

(73) Assignee: ROLAND DG CORPORATION, Shizuoka (JP)

( * ) Notice: Subject to any disclaimer, the term of this patent is extended or adjusted under 35 U.S.C. 154(b) by 495 days.

(21) Appl. No.: 14/809,364

(22) Filed: Jul. 27, 2015

(65) Prior Publication Data
US 2016/0031158 A1    Feb. 4, 2016

(30) Foreign Application Priority Data
Jul. 29, 2014    (JP) .................................. 2014-153746

(51) Int. Cl.
| | | |
|---|---|---|
| B29C 67/00 | (2017.01) | |
| B29C 43/32 | (2006.01) | |
| B33Y 30/00 | (2015.01) | |
| B33Y 40/00 | (2015.01) | |
| B29C 64/106 | (2017.01) | |
| B29C 64/112 | (2017.01) | |

(Continued)

(52) U.S. Cl.
CPC ........ *B29C 67/0085* (2013.01); *B29C 64/106* (2017.08); *B29C 64/112* (2017.08); *B29C 64/20* (2017.08); *B33Y 30/00* (2014.12); *B33Y 40/00* (2014.12); *B29K 2101/12* (2013.01)

(58) Field of Classification Search
CPC ......... B33Y 30/00; B33Y 99/00; B33Y 40/00; B29C 64/00; B29C 64/20; B29C 64/22; B29C 64/245
USPC ....................................... 425/375; 74/490.07
See application file for complete search history.

(56) References Cited

U.S. PATENT DOCUMENTS

| | | | |
|---|---|---|---|
| 4,976,582 A | 12/1990 | Clavel | |
| 6,671,975 B2 * | 1/2004 | Hennessey | ........... H02N 2/0095 33/533 |

(Continued)

FOREIGN PATENT DOCUMENTS

| | | |
|---|---|---|
| CN | 103552386 A | 2/2014 |
| JP | 63-501860 A | 7/1988 |

(Continued)

OTHER PUBLICATIONS https://www.youtube.com/watch?v=S_jhEU8hQRs (Jul. 30, 2013).*
Official Communication issued in corresponding European Patent Application No. 15178581.3, dated Dec. 8, 015.

*Primary Examiner* — Joseph S Del Sole
*Assistant Examiner* — Thu Khanh T Nguyen
(74) *Attorney, Agent, or Firm* — Keating & Bennett, LLP

(57) ABSTRACT

A three-dimensional printing device includes a base, a holder disposed above the base, a printing head fixed on the holder and including a nozzle configured to discharge a resin material, a stage disposed in the base below the printing head configured to hold the resin material discharged from the nozzle, and a stage moving mechanism configured to move the stage with five or more degrees of freedom.

17 Claims, 18 Drawing Sheets

(51) Int. Cl.
*B29C 64/20* (2017.01)
*B29K 101/12* (2006.01)

(56) References Cited

U.S. PATENT DOCUMENTS

| | | | |
|---|---|---|---|
| 7,168,935 B1 * | 1/2007 | Taminger | B23K 15/0073 219/121.12 |
| 7,938,602 B2 * | 5/2011 | Ota | B23Q 1/4857 409/201 |
| 8,956,068 B2 * | 2/2015 | Mekid | F16M 11/043 248/176.1 |
| 9,566,708 B2 * | 2/2017 | Kurnianto | B25J 9/02 |
| 9,803,800 B2 * | 10/2017 | Hwang | F16M 13/022 |
| 2003/0005786 A1 | 1/2003 | Stuart et al. | |
| 2004/0086351 A1 * | 5/2004 | Kim | B23Q 1/34 409/235 |
| 2010/0206224 A1 | 8/2010 | Thurner et al. | |
| 2014/0197576 A1 * | 7/2014 | Kraibuhler | B29C 67/0059 264/308 |
| 2016/0096329 A1 * | 4/2016 | Ko | B33Y 30/00 264/129 |

FOREIGN PATENT DOCUMENTS

| | | | |
|---|---|---|---|
| JP | 09-323361 A | 12/1997 | |
| JP | 2000-280354 A | 10/2000 | |
| JP | 2000-280355 A | 10/2000 | |
| JP | 2005-536703 A | 12/2005 | |
| JP | 2012-126059 A | 7/2012 | |
| JP | 2012-126959 A | 7/2012 | |
| WO | 03/004223 A2 | 1/2003 | |
| WO | 2009/040352 A1 | 4/2009 | |
| WO | 2012/171644 A1 | 12/2012 | |

* cited by examiner

THREE-DIMENSIONAL PRINTING DEVICE

The present application claims priority based on Japanese Patent Application No. 2014-153746, filed on Jul. 29, 2014, the disclosure of which is hereby incorporated by reference in its entirety.

BACKGROUND OF THE INVENTION

1. Field of the Invention

The present invention relates to a three-dimensional printing device.

2. Description of the Related Art

Three-dimensional printing devices for printing three-dimensional printed objects by curing a resin material and successively depositing layers of the resin material each having a predetermined cross-sectional shape have been known in the art.

A three-dimensional printing device of this type includes a printing head having a nozzle for discharging the resin material, and a stage for holding the discharged resin material thereon. Layers of the resin material are successively deposited on the stage. The printing head and the stage are configured so as to be movable relative to each other. The printing head moves, as necessary, relative to the stage while discharging the resin material, thus depositing a layer of the resin material having a predetermined cross-sectional shape on the stage or on an already-cured resin material. Three-dimensional printing devices configured so that the printing head is set unmovable and the stage is movable in the X-axis direction, the Y-axis direction and the Z-axis direction have been known in the art. Japanese Laid-Open Patent Publication No. 2000-280354 discloses a three-dimensional printing device in which the printing head is configured so as to be movable in the X-axis direction and the Y-axis direction, and the stage is configured so as to be movable in the Z-axis direction.

Now, layers of the resin material are deposited upward, and if a three-dimensional printed object to be printed has a projecting portion projecting in the horizontal direction, such a projecting portion, when printed with no countermeasures, will bend downward by its own weight. Therefore, when printing a three-dimensional printed object 100 having a projecting portion 102, a support member 104 needs to be printed, in addition to the three-dimensional printed object 100, underneath the projecting portion 102 for supporting the projecting portion 102, as shown in FIG. 18. However, the support member 104 is a member unnecessary for the completed three-dimensional printed object 100. The support member 104 needs to be removed after the three-dimensional printed object 100 is printed. Therefore, the conventional three-dimensional printing device requires an operation of removing the support member 104, and produces a wasted resin material.

Since tubes, cables, and the like, for supplying the material are attached to the printing head, a three-dimensional printing device in which the printing head is moved requires a large margin space around the printing head so that the tubes, cables, and the like, will not interfere with other members. There is also a need to bundle cables together by using a cover member covering the cables. Thus, a conventional three-dimensional printing device tends to have a complicated structure and a large size.

SUMMARY OF THE INVENTION

Preferred embodiments of the present invention provide a three-dimensional printing device equipped with simplified structures around the printing head while preventing the three-dimensional printing device from becoming large in size. The three-dimensional printing device is also possible to eliminate or reduce the need to use support members when printing three-dimensional printed objects, thus reducing or eliminating wasted resin material.

A three-dimensional printing device according to a preferred embodiment of the present invention is a three-dimensional printing device for printing a three-dimensional printed object by curing a resin material so as to successively deposit layers of resin each having a predetermined cross-sectional shape, the three-dimensional printing device including: a base; a holder disposed above the base; a printing head fixed on the holder and including a nozzle configured to discharge the resin material; a stage disposed below the printing head and movably supported on the base, the stage being configured to hold the resin material discharged from the nozzle; and a stage moving mechanism configured to move the stage with five or more degrees of freedom.

With the three-dimensional printing device according to a preferred embodiment of the present invention, the stage moving mechanism moves the stage with five or more degrees of freedom. For example, the stage can not only translate in three axis directions, but also rotate about two or more axes. Therefore, when printing a three-dimensional printed object, it is possible to move the stage to an intended position and to set the stage in an intended attitude. For example, the stage is able to be set in an attitude tilted with respect to the printing head. Therefore, it is possible to print, without using a support member, a portion where the resin material cannot be deposited by a conventional three-dimensional printing device without using a support member, e.g., a portion that is projecting in the horizontal direction. As a result, it is possible to reduce the amount of support members to be used when printing a three-dimensional printed object, and reduce the number of steps for removing support members. The printing head is fixed on the holder disposed above the base, and the printing head is set unmovable. Since no space is needed to allow for the movement of the printing head, the three-dimensional printing device is much more compact. Moreover, since cables, and the like, attached to the printing head are not moved during the printing process, for example, the cables, and the like, will not interfere with other members. This eliminates the need to provide a cover member for bundling together the cables.

In one aspect of various preferred embodiments of the present invention, the three-dimensional printing device further includes a tank disposed above the base and configured to contain the resin material therein; and a resin supply passageway connected to the tank and the printing head.

According to this aspect, the tank is disposed above the base. Therefore, as compared with a case where the tank is disposed on the side of the base, it is possible to reduce the width of the three-dimensional printing device. Thus, the three-dimensional printing device has a more compact structure. With a three-dimensional printing device where the printing head is movable, there is a need to provide a space around the printing head to allow for the movement of the printing head, and it is difficult to dispose the tank above the base. With the three-dimensional printing device according to a preferred embodiment of the present invention, however, since the printing head is set unmovable, it is easy to dispose the tank above the base, thus significantly reducing the size of the three-dimensional printing device. Since the tank is disposed above the base, together with the printing head, it is possible to shorten the distance between the printing head and the tank, and to thus shorten the resin supply passageway. This simplifies the structure of the resin supply passageway and also reduces the flow resistance of the resin through the resin supply passageway, resulting in desirably supplying the resin from the tank to the printing head. Moreover, the resin tends not to clog inside the resin supply passageway.

In one aspect of various preferred embodiments of the present invention, the stage moving mechanism includes first to sixth guide portions configured to move up and down; first to sixth actuators configured to move up and down the first to sixth guide portions, respectively; and first to sixth rods each of which includes a first end portion connected to the stage via a first universal joint therebetween and a second end portion connected to an associated one of the first to sixth guide portions via a second universal joint therebetween, wherein the stage moving mechanism moves the stage with six degrees of freedom.

According to this aspect, the stage moving mechanism is able to move the stage in the X-axis direction, in the Y-axis direction and in the Z-axis direction, and rotate the stage about the X axis, about the Y axis and about the Z axis, for example, by appropriately moving the first to sixth guide portions up and down. This allows for a reduction in the actuator output as compared with a stage moving mechanism that uses a table provided with an actuator capable of movement in the X-axis direction, an actuator capable of movement in the Y-axis direction, and an actuator capable of movement in the Z-axis direction. Moreover, since it is possible to use smaller actuators, it is possible to reduce the size of the stage moving mechanism.

In one aspect of various preferred embodiments of the present invention, the three-dimensional printing device further includes a circuit board disposed above the base and electrically connected to the first to sixth actuators.

Since the printing head is set unmovable, there is no need to provide a space above the base to allow for the movement of the printing head. Thus, the space above the base is effectively utilized as a space for installing other components. According to this aspect, the circuit board is disposed above the base. Therefore, it is possible to reduce the width of the three-dimensional printing device, as compared with a case where the circuit board is disposed on the side of the base. This makes the structure of the three-dimensional printing device more compact.

In one aspect of various preferred embodiments of the present invention, the resin material is a thermoplastic resin; and the printing head includes a heater configured to heat the thermoplastic resin.

According to this aspect, the printing head includes a heater. If the printing head were movable, the heater would move together with the printing head. With the three-dimensional printing device according to a preferred embodiment of the present invention, however, the printing head is set unmovable. This simplifies the wiring of the heater, etc., and increases the degree of freedom in the layout of the heater, as compared with a case where the heater is moved together with the printing head.

In one aspect of various preferred embodiments of the present invention, the base includes a first base, a plurality of posts extending upward from the first base, and a second base supported by the plurality of posts and disposed above the first base, the second base including an opening therein; the holder disposed on the second base; and the nozzle overlaps the opening as seen from above.

According to this aspect, the printing head is fixed on the holder disposed on the second base. Therefore, there is no need for a cover member for bundling together cables to be attached to the printing head, and the three-dimensional printing device has a much more compact structure. Since the nozzle and the opening overlap each other as seen from above, the resin material discharged from the nozzle is supplied onto the stage without being obstructed by the second base.

In one aspect of various preferred embodiments of the present invention, the nozzle includes a discharge port that discharges the resin material; and an opening area of the discharge port is variable.

According to this aspect, since the amount of the resin material discharged from the nozzle is able to be varied, the amount of the resin material discharge is reduced by reducing the opening area of the discharge port when printing fine portions, thus making it possible to print a three-dimensional printed object with a higher precision. On the other hand, for portions that require a large amount of the resin material, it is possible to enlarge the opening area of the discharge port so as to discharge a large amount of the resin material in a single shot, thus improving the printing speed.

In one aspect of various preferred embodiments of the present invention, an opening width of the discharge port, which represents a length in an up-down direction of the resin material discharged from the discharge port, is constant; and when the nozzle discharges the resin material, the stage moving mechanism moves the stage relative to the nozzle in a direction of the opening width of the discharge port.

According to this aspect, by varying the opening area of the discharge port, it is possible to vary the amount of the resin material discharged from the discharge port while keeping constant the thickness of the resin material discharged onto the stage, i.e., the height of the resin material in the up-down direction.

In one aspect of various preferred embodiments of the present invention, the three-dimensional printing device further includes a plate-shaped member disposed under the discharge port, wherein the discharge port is rectangular or substantially rectangular; the plate-shaped member includes an opening overlapping the discharge port, wherein an opening length of the opening along a long side of the discharge port varies between at least two positions in a direction along a short side of the discharge port; and the plate-shaped member is configured so as to move in a direction crossing the long side of the discharge port to vary an area over which the discharge port and the opening overlap each other.

According to this aspect, the opening width is able to be kept constant with a simple structure wherein the discharge port is rectangular or substantially rectangular. Thus, by varying the area over which the discharge port and the opening overlap each other, it is possible to vary the amount of the resin material discharged from the discharge port while keeping constant the thickness of the resin material discharged onto the stage.

In one aspect of various preferred embodiments of the present invention, the opening is triangular or substantially triangular.

According to this aspect, it is possible to continuously vary the amount of the resin material discharged from the nozzle.

In one aspect of various preferred embodiments of the present invention, the plate-shaped member is configured so as to move in a direction crossing the long side of the discharge port so that a portion of the plate-shaped member excluding the opening entirely covers the discharge port.

According to this aspect, the plate-shaped member is able to entirely cover the discharge port. With the plate-shaped member entirely covering the discharge port, it is possible to stop discharging the resin material onto the stage without stopping the supply of the resin material.

In one aspect of various preferred embodiments of the present invention, the three-dimensional printing device further includes a plate-shaped member disposed under the discharge port, wherein the plate-shaped member includes a rectangular or substantially rectangular opening overlapping with the discharge port; an opening length of the discharge port along a long side of the opening varies between at least two positions in a direction along a short side of the opening; and the plate-shaped member is configured so as to move in a direction crossing the long side of the opening to vary an area over which the discharge port and the opening overlap each other.

According to this aspect, since the amount of the resin material discharged from the nozzle is able to be varied, it is possible to print a three-dimensional printed object with a higher precision.

In one aspect of various preferred embodiments of the present invention, the discharge port is triangular or substantially triangular.

According to this aspect, it is possible to continuously vary the amount of the resin material discharged from the nozzle.

In one aspect of various preferred embodiments of the present invention, the plate-shaped member is configured so as to move in a direction crossing the long side of the opening so that a portion of the plate-shaped member excluding the opening entirely covers the discharge port.

According to this aspect, with the plate-shaped member entirely covering the discharge port, it is possible to stop discharging the resin material onto the stage without stopping the supply of the resin material.

In one aspect of various preferred embodiments of the present invention, there are a plurality of projections provided on the stage.

According to this aspect, since the resin material is held by a plurality of projections, it is possible to prevent the resin material from slipping on the stage when the stage is tilted.

In one aspect of various preferred embodiments of the present invention, the projections are each cone-shaped; and an interval between vertexes of the projections is less than or equal to a length of a long side of the discharge port or a length of a long side of the opening.

According to this aspect, when the resin material is discharged from the nozzle onto the stage, the resin material comes into contact with the vertexes of the projections, thus reliably securing the resin material on the stage.

According to various preferred embodiments of the present invention, it is possible to provide a three-dimensional printing device equipped with simplified structures around the printing head while preventing the three-dimensional printing device from becoming large in size. The three-dimensional printing device is also possible to eliminate or reduce the need to use support members when printing three-dimensional printed objects, thus reducing or eliminating wasted resin material.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
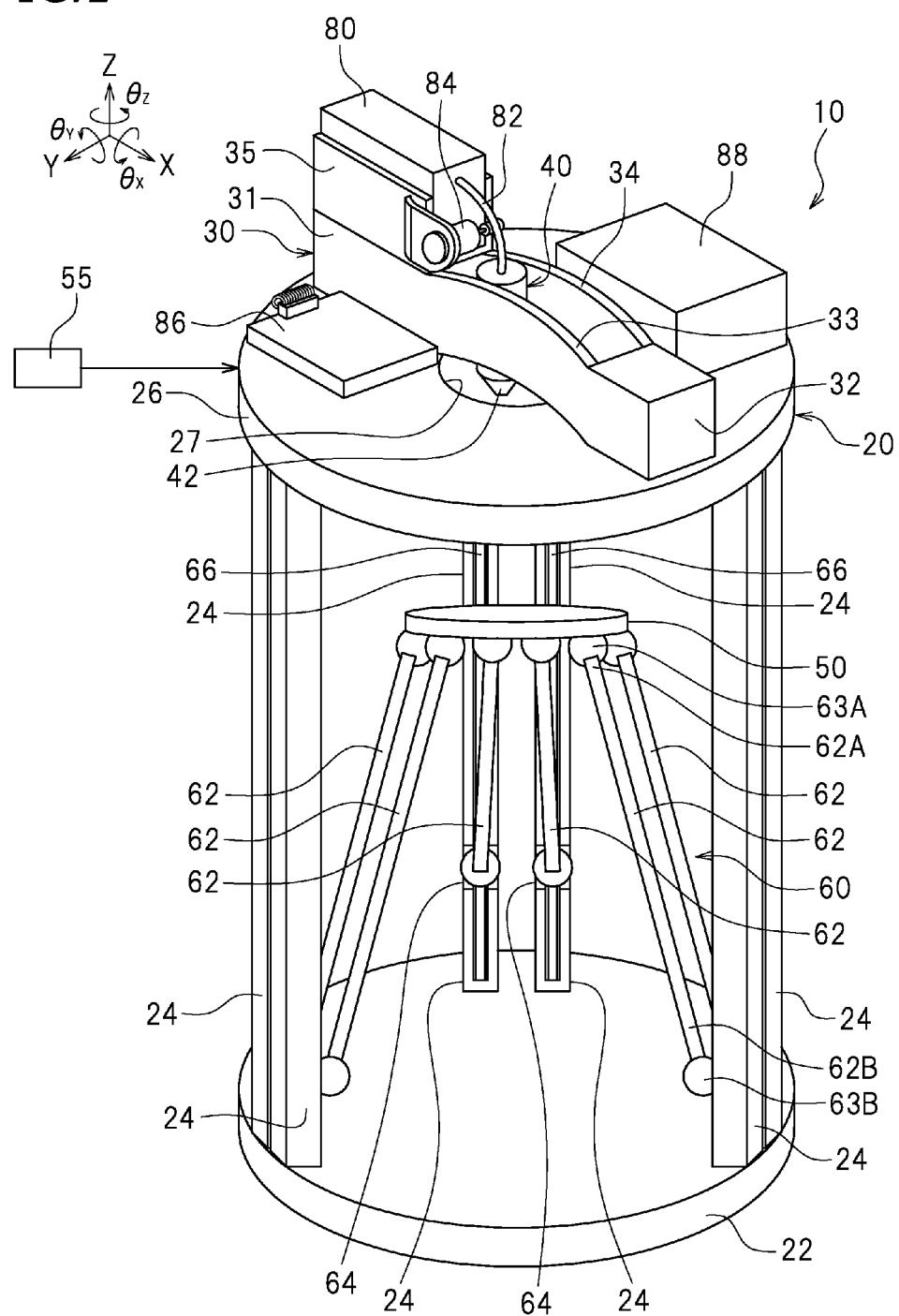
FIG. 1 is a perspective view showing a structure of a three-dimensional printing device according to a preferred embodiment of the present invention.

Preferred embodiments of the present invention will now be described with reference to the drawings. As shown in FIG. 1, a three-dimensional printing device 10 of the present preferred embodiment cures a resin material to successively deposit layers of resin each having a predetermined cross-sectional shape, thus printing a three-dimensional printed object. The resin material may be a thermoplastic resin, a photo-curable resin, an ultraviolet-curable resin, and the like. While the following description is directed to a case where the resin material preferably is a thermoplastic resin, it should be noted that the present invention is not limited by the use of the particular type of a resin material.

Figure 2:
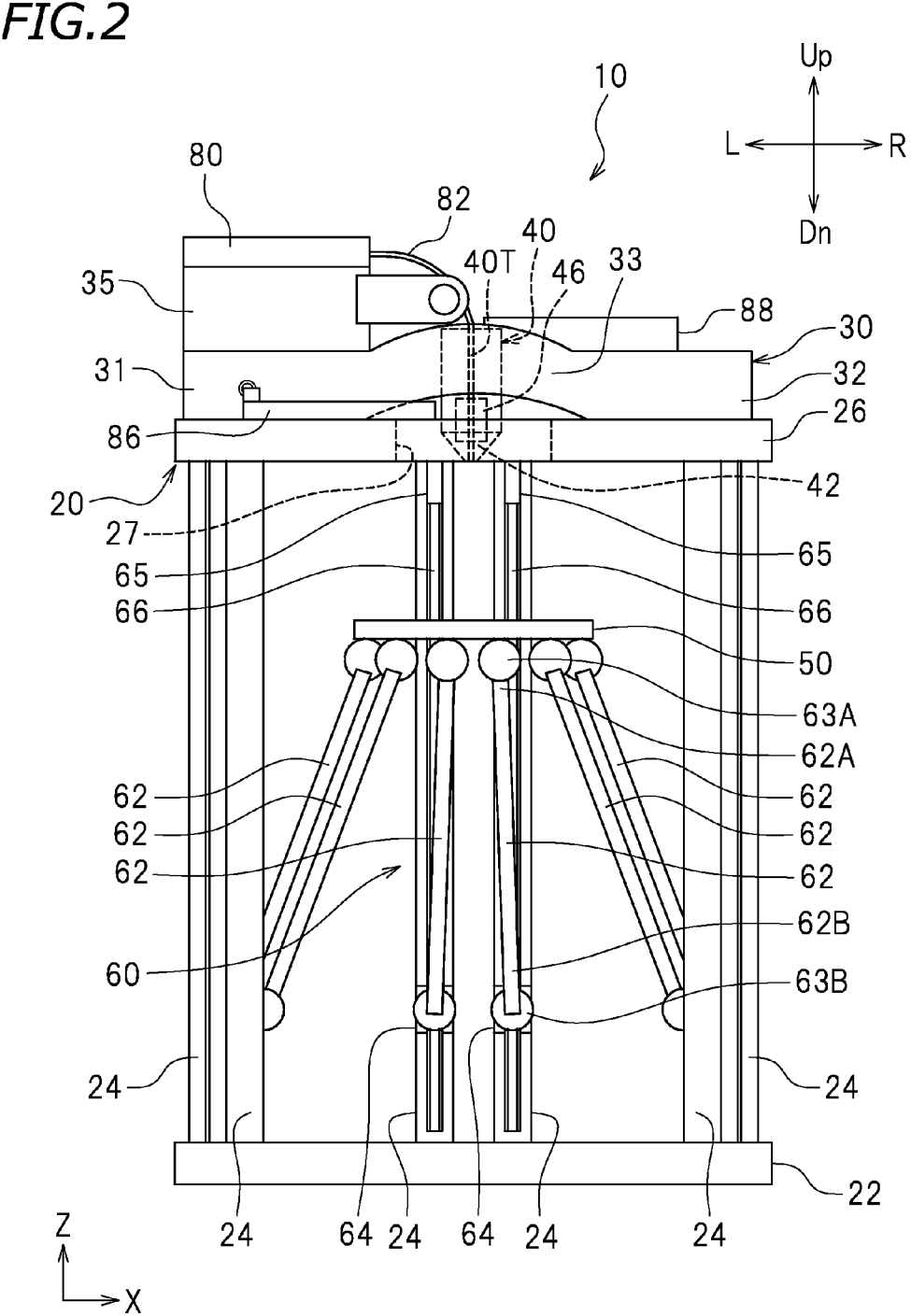
FIG. 2 is a side view showing the structure of the three-dimensional printing device according to a preferred embodiment of the present invention.
Figure 3:
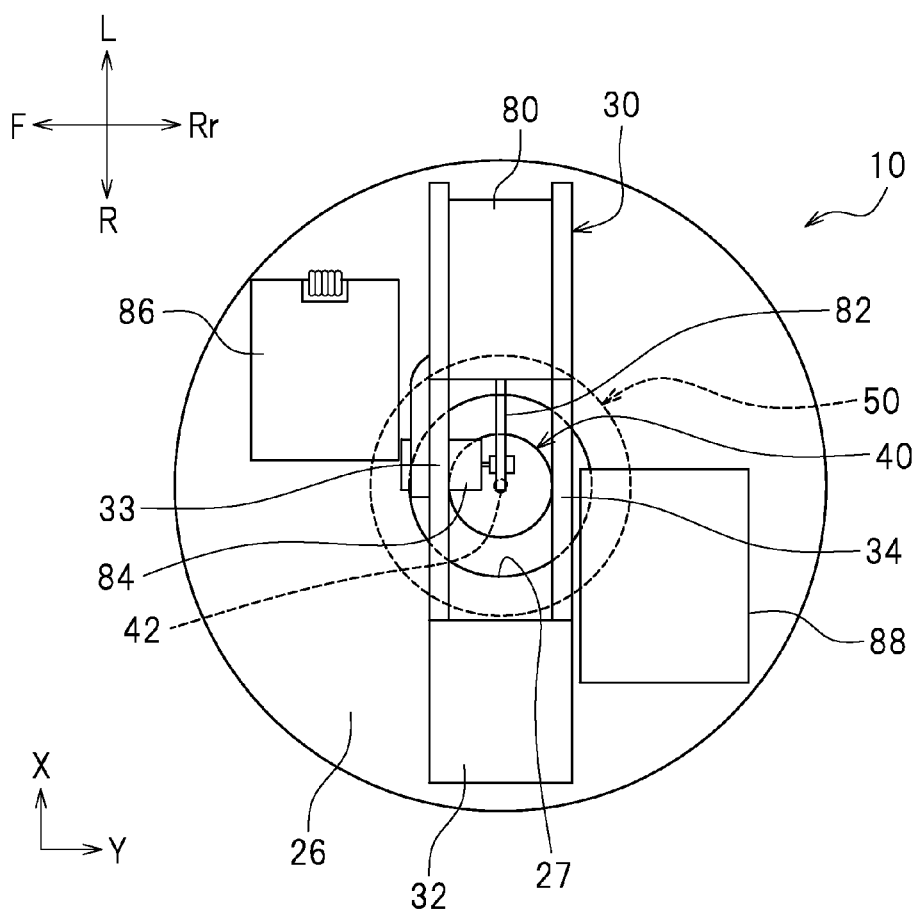
FIG. 3 is a plan view showing the structure of the three-dimensional printing device according to a preferred embodiment of the present invention.

Left, right, up and down in FIG. 2 are assumed to correspond to these directions of the three-dimensional printing device 10, unless otherwise specified. Left, right, up and down in FIG. 3 are assumed to correspond to front, rear, left and right, respectively, of the three-dimensional printing device 10. The reference signs F, Rr, L, R, Up and Dn, as used in the figures, refer to front, rear, left, right, up and down, respectively. The reference sign X in the figures denotes the X axis, representing the left-right direction. The reference sign Y in the figures denotes the Y axis, representing the front-rear direction. The reference sign Z in the figures denotes the Z axis, representing the up-down direction. The reference signs $\theta_X$, $\theta_Y$ and $\theta_Z$ represent rotation directions about the X axis, the Y axis and the Z axis, respectively. In the present preferred embodiment, each of the X axis, the Y axis and the Z axis is orthogonal to the other two axes. Note however that the X axis, the Y axis and the Z axis may each be only crossing the other two axes. These directions are defined as described above merely for the purpose of illustration, and it is not intended to impose any limitation on how the three-dimensional printing device 10 is installed.

As shown in FIG. 1, the three-dimensional printing device 10 includes a base 20, a holder 30, a printing head 40, a stage 50, and a stage moving mechanism 60.

As shown in FIG. 1, the three-dimensional printing device 10 is communicably connected to a computer 55. The three-dimensional printing device 10 may remain connected to the computer 55 at all times, or may be connected thereto as necessary. The connection between the three-dimensional printing device 10 and the computer 55 is not limited to a wired connection, but may be a wireless connection. The computer 55 may include a central processing unit (hereinafter referred to as a CPU), a ROM storing programs to be executed by the CPU, a RAM, etc. The computer 55 may be a dedicated computer for the three-dimensional printing device 10, or may be a general-purpose computer such as a personal computer.

As shown in FIG. 1, the base 20 includes a first base 22, six posts 24, and a second base 26. The first base 22 is disc-shaped. The posts 24 are extending upward from the first base 22. The second base 26 is disc-shaped. The second base 26 is provided with an opening 27 therein. As shown in FIG. 2, the second base 26 is disposed above the first base 22. The second base 26 is disposed on the six posts 24. The diameter of the first base 22 is equal or substantially equal to the diameter of the second base 26.

As shown in FIG. 1, the holder 30 is disposed above the base 20. The holder 30 is disposed on the second base 26. The holder 30 is disposed so as to bridge the opening 27 of the second base 26. The holder 30 includes a first portion 31 and a second portion 32 disposed above the base 20, and a first wall 33 and a second wall 34 that connect between the first portion 31 and the second portion 32. The first portion 31 is fixed on the second base 26. The second portion 32 is fixed on the second base 26. The printing head 40 is disposed between the first wall 33 and the second wall 34. The first wall 33 and the second wall 34 support the printing head 40. As shown in FIG. 3, the holder 30 overlaps the opening 27 as seen from above. The first wall 33 and the second wall 34 overlap the opening 27 as seen from above.

As shown in FIG. 1, the printing head 40 is fixed on the holder 30. The printing head 40 includes a nozzle 42 that discharges a resin material. As shown in FIG. 3, the nozzle 42 overlaps the opening 27 of the second base 26 as seen from above. As shown in FIG. 2, the nozzle 42 overlaps the second base 26 as seen from the side. The nozzle 42 may be disposed above the second base 26. The nozzle 42 may be disposed below the second base 26. The printing head 40 includes a heater 46 that heats a thermoplastic resin. The heater 46 is disposed inside the printing head 40. The heater 46 is disposed so as to surround a resin passageway 40T extending through the printing head 40.

Figure 4:
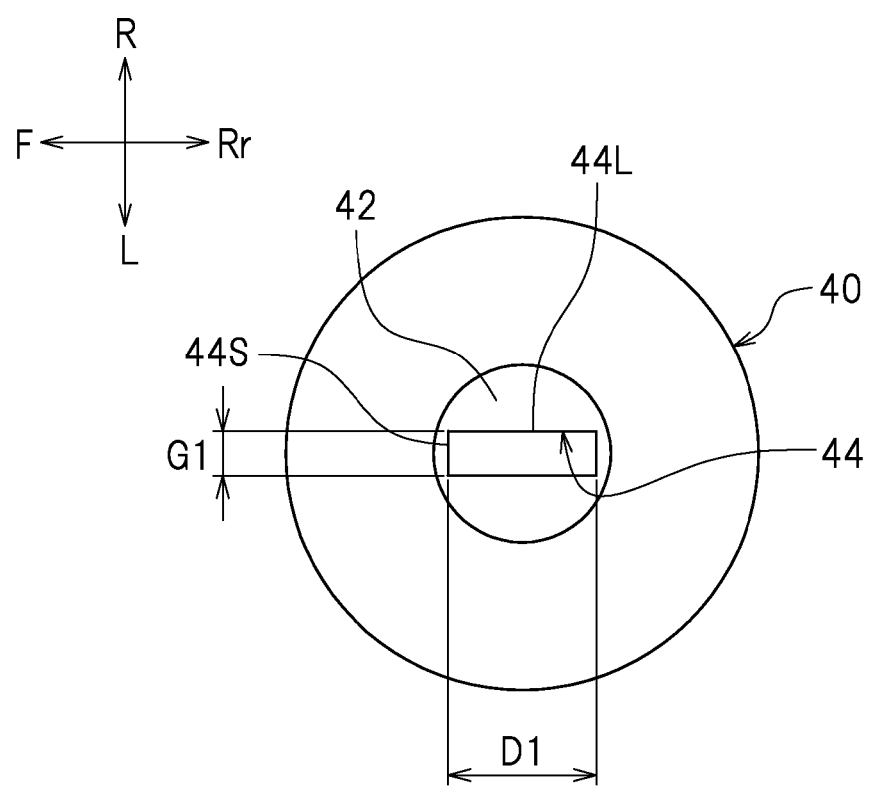
FIG. 4 is a bottom view showing a printing head according to a preferred embodiment of the present invention.

As shown in FIG. 4, the nozzle 42 has a discharge port 44 that discharges a resin material. The discharge port 44 has an opening facing downward. The discharge port 44 has a rectangular or substantially rectangular shape with a long side 44L and a short side 44S. In the following description, the length of the long side 44L of the discharge port 44 will be referred to as the opening length D1, and the length of the short side 44S of the discharge port 44 will be referred to as the opening width G1. In the present preferred embodiment, the opening width G1 of the discharge port 44 defines the thickness of the resin material discharged from the discharge port 44. The opening width G1 of the discharge port 44 defines the length, in the up-down direction, of the resin material discharged from the discharge port 44. The shape of the discharge port 44 is not limited to rectangular or substantially rectangular, but may be elliptical or substantially elliptical, trapezoidal or substantially trapezoidal, circular or substantially circular, and the like.

As shown in FIG. 1, the three-dimensional printing device 10 includes a tank 80 containing a resin material therein. The tank 80 is disposed above the base 20. The tank 80 is disposed on the holder 30. The tank 80 is disposed in a tank receiving portion 35 attached to the first portion 31 of the holder 30. The tank 80 is replaceable.

As shown in FIG. 1, the three-dimensional printing device 10 includes a resin supply passageway 82. The resin supply passageway 82 is connected to the tank 80 and the printing head 40. The resin supply passageway 82 is connected to the resin passageway 40T (see FIG. 2). A resin material in the tank 80 is supplied to the printing head 40 through the resin supply passageway 82. The resin supply passageway 82 may be a flexible tube, for example. The resin supply passageway 82 may be a metal pipe. A motor 84 is disposed on the holder 30. The motor 84 is disposed on the tank receiving portion 35 of the holder 30. By driving the motor 84, it is possible to supply the resin material in the resin supply passageway 82 to the printing head 40. The motor 84 is electrically connected to a circuit board 86 to be described below. The motor 84 is controlled by the computer 55.

Figure 5:
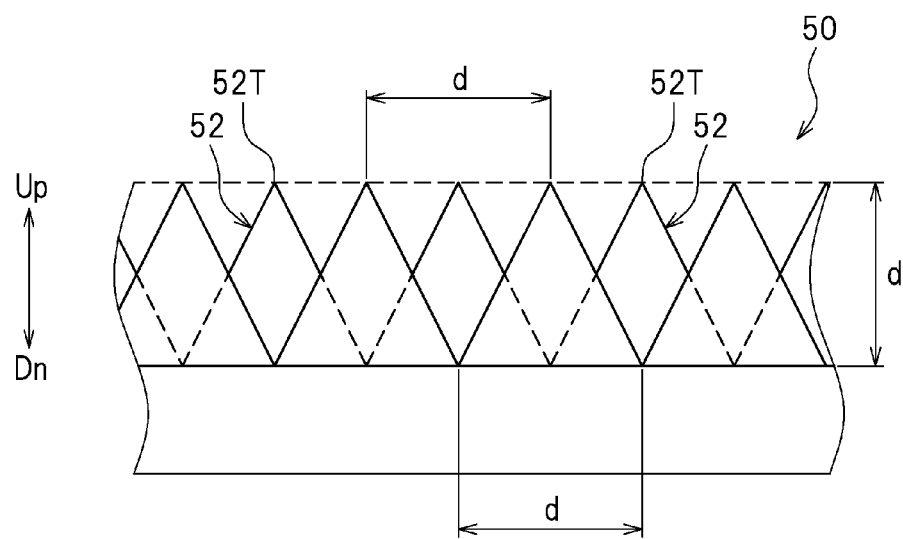
FIG. 5 is a side view showing a portion of a stage according to a preferred embodiment of the present invention.
Figure 6:
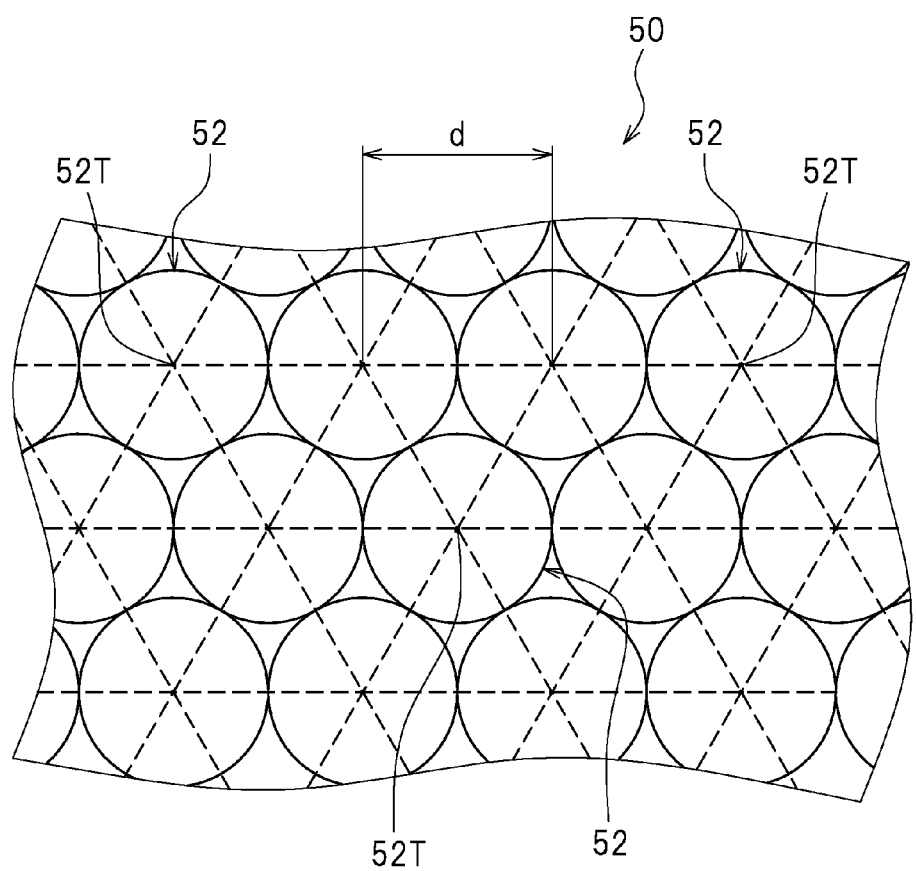
FIG. 6 is a plan view showing a portion of the stage according to a preferred embodiment of the present invention.

As shown in FIG. 1, the stage 50 is disposed in the base 20. The stage 50 is disposed below the printing head 40. The stage 50 is disposed above the first base 22 and below the second base 26. Note that the stage 50 may be disposed above the second base 26 as long as it is disposed below the printing head 40. The stage 50 holds the resin material discharged from the nozzle 42 of the printing head 40. A printed object is printed on the stage 50. As shown in FIG. 5, there are a plurality of cone-shaped projections 52 provided on the surface of the stage 50. Note that the projections 52 are not shown in FIG. 1 and in some other figures. The projections 52 are an example of grip enhancers that make it easier for a printed object to be held on the stage 50. Herein, the diameter of each projection 52 is equal or substantially equal to the height thereof. Where the diameter of each projection 52 is d, the height thereof is also d. As shown in FIG. 6, the projections 52 are disposed so that the interval between vertexes 52T of projections 52 is d. In the present preferred embodiment, the projections 52 are disposed so that vertexes 52T of three adjacent projections 52 are vertexes of an equilateral triangle each side of which has a length of d. The interval d between vertexes 52T of projections 52 is less than or equal to the length D1 of the long side 44L (see FIG. 4) of the discharge port 44 of the nozzle 42. Note that the height of a projection 52 may be greater than the diameter d thereof, e.g., 2d. Moreover, the height of a projection 52 may be smaller than the diameter d thereof, e.g., about ½d.

As shown in FIG. 1, the stage moving mechanism 60 is disposed in the base 20. The stage moving mechanism 60 moves the stage 50 with six degrees of freedom. The stage moving mechanism 60 translates the stage 50 with three degrees of freedom and rotates the stage 50 with three degrees of freedom. That is, the stage moving mechanism 60 is configured to translate the stage 50 in the X-axis direction, in the Y-axis direction, and in the Z-axis direction, and to rotate the stage 50 about the X axis, about the Y axis, and about the Z axis.

As shown in FIG. 2, the stage moving mechanism 60 is a six-degree-of-freedom parallel link mechanism. The stage moving mechanism 60 includes six rods 62 linked to the stage 50, six guide portions 64 (only two are shown in FIG. 2), each of which is linked to a rod 62 and is able to move up and down along a post 24, and six actuators 65 (only two are shown in FIG. 2) that move up and down the guide portions 64. The rods 62, the guide portions 64 and the actuators 65 are disposed in the base 20. Each rod 62 has a first universal joint 63A at its first end 62A. Each rod 62 has a second universal joint 63B at its second end 62B. The first universal joint 63A supports the stage 50. The first universal joint 63A links together the first end 62A of the rod 62 and the stage 50.

Each guide portion 64 is a slider slidably engaged with the post 24. The second universal joint 63B is connected to the guide portion 64. The second universal joint 63B links together the second end 62B of the rod 62 and the guide portion 64. Each post 24 is provided with a groove extending therealong, and a ball screw 66 extending in the up-down direction is disposed in the groove. An actuator 65 that rotates the ball screw 66 is disposed at the upper end of the ball screw 66. The actuator 65 may be a servo motor, for example, while there is no particular limitation on the type of the actuator 65. Each guide portion 64 is provided with a screw hole (not shown) extending in the up-down direction. The ball screw 66 is inserted in the screw hole of the guide portion 64, and the screw hole of the guide portion 64 meshes with the ball screw 66. Therefore, the guide portion 64 moves up when the ball screw 66 rotates in one direction, and the guide portions 64 moves down when the ball screw 66 rotates in the reverse direction. The rod 62 moves as the guide portion 64 moves up and down.

Each actuator 65 operates independently and move a rod 62 associated therewith independently of the other rods 62. As shown in FIG. 1, the actuators 65 are electrically connected to the circuit board 86 disposed above the base 20. The circuit board 86 is disposed on the second base 26. The six rods 62 are movable independently of one another, thus allowing for the stage 50 to translate in the X-axis direction, the Y-axis direction and the Z-axis direction, and to rotate about the X axis, the Y axis and the Z axis, in the base 20. The six rods 62 are movable independently of one another, thus making it possible to freely set the position and the attitude of the stage 50.

As shown in FIG. 1, a power source box 88 is disposed on the second base 26.

Figure 7:
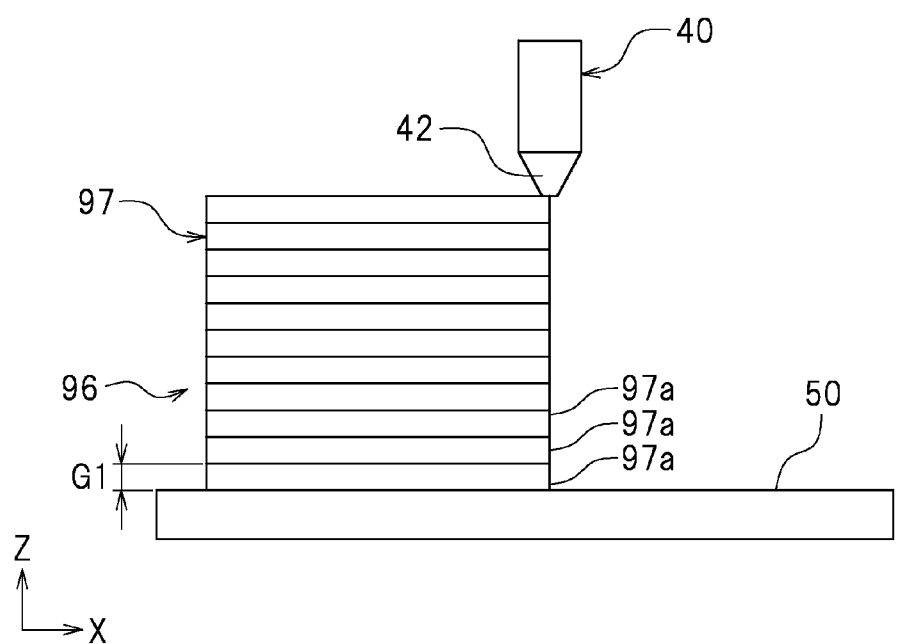
FIG. 7 is a schematic diagram showing a printed object being printed on the stage according to a preferred embodiment of the present invention.
Figure 8:
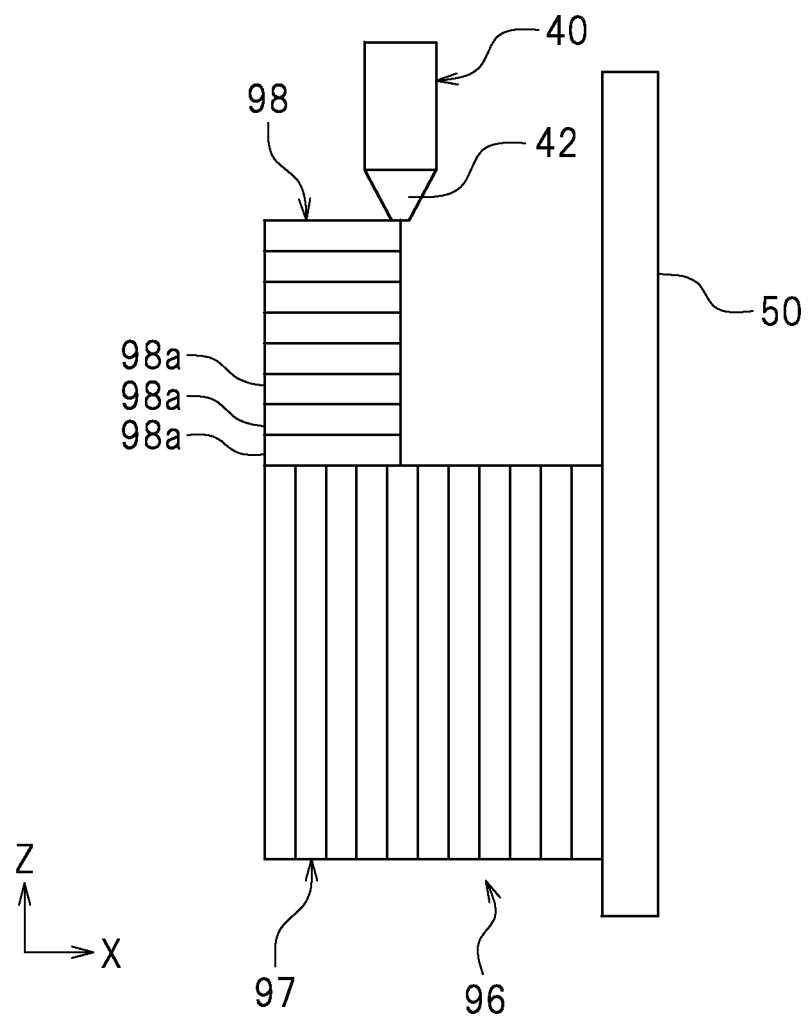
FIG. 8 is a schematic diagram showing a printed object being printed on the stage according to a preferred embodiment of the present invention.

Next, referring to FIGS. 7 and 8, an example operation of the three-dimensional printing device 10 of the present preferred embodiment will be described. The following description is directed to an example of printing a three-dimensional printed object 96 including a body portion 97, and a projecting portion 98 (see FIG. 8) projecting in the horizontal direction from the body portion 97.

First, the body portion 97 is printed by successively depositing resin layers 97a each having a predetermined cross-sectional shape. As shown in FIG. 7, a resin material is discharged from the nozzle 42 toward the stage 50. Since the printing head 40 having the nozzle 42 is fixed on the holder 30, the printing head 40 is set unmovable, and only the stage 50 moves in the X-axis direction and in the Y-axis direction. The discharged resin material is then cured. Thus, a single resin layer 97a is printed, which defines a portion of the body portion 97. The thickness of the resin layer 97a (the length of the resin layer 97a in the up-down direction) is equal or substantially equal to the length G1 of the short side 44S (see FIG. 4) of the discharge port 44. Then, as a solid resin layer 97a having a predetermined cross-sectional shape is formed as described above, the stage moving mechanism 60 is driven to move the stage 50 downward along the Z-axis direction. This moves the resin layer 97a, held on the stage 50, downward, thus creating a gap between the resin layer 97a and the printing head 40. Then, the resin material is discharged from the nozzle 42 into the gap while the stage 50 moves in the X-axis direction and in the Y-axis direction. Thus, a new resin layer 97a having a predetermined cross-sectional shape is formed on the already-formed resin layer 97a. Thereafter, generally the same operation is repeated, thus printing the body portion 97 having an intended three-dimensional shape.

Then, the projecting portion 98 is printed. As shown in FIG. 8, before the projecting portion 98 is printed, the stage moving mechanism 60 is driven to rotate the stage 50 in the direction $\theta_Y$ about the Y axis (see FIG. 1). Then, the resin material is discharged from the nozzle 42 onto the previously-printed body portion 97. The discharged resin material is then cured. Then, as a solid resin layer 98a having a predetermined cross-sectional shape is formed by the resin material, the stage moving mechanism 60 is driven to move the stage 50 downward in the Z-axis direction while being tilted (vertical with respect to the horizontal line). This moves the resin layer 98a, held on the stage 50, downward, thus creating a gap between the resin layer 98a and the printing head 40. Then, the resin material is discharged from the nozzle 42 into the gap while the stage 50 moves in the X-axis direction and in the Y-axis direction. Thus, a new resin layer 98a having a predetermined cross-sectional shape is formed on the already-formed resin layer 98a. Thereafter, generally the same operation is repeated, thus printing a three-dimensional printed object having the projecting portion 98, which has an intended three-dimensional shape, and the body portion 97. Note that since there are a plurality of cone-shaped projections 52 (see FIG. 5) provided on the stage 50, the discharged resin material is stuck on the stage 50. Therefore, it is possible to reliably prevent the resin material from moving off the stage 50 when the stage 50 is tilted.

Figure 18:
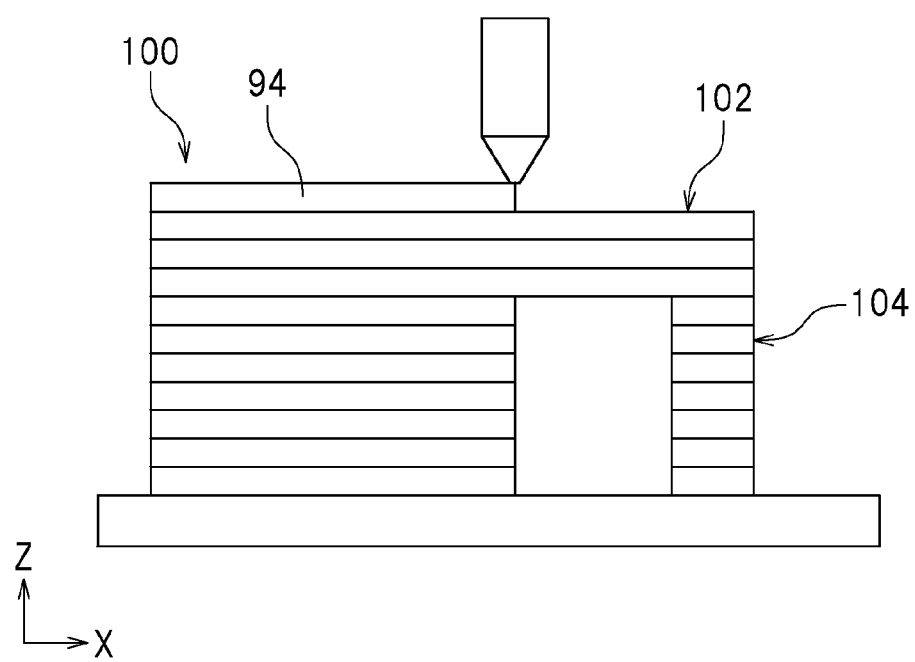
FIG. 18 is a schematic diagram showing a printed object being molded on a stage according to a conventional technique.

As shown in FIG. 18, with the conventional three-dimensional printing device, the direction in which a resin material 94 is discharged is not equal to the direction in which the projecting portion 102 to be printed is projecting. Therefore, it is necessary to form, in advance, the support member 104 underneath the projecting portion 102 to prevent the projecting portion 102 from bending downward by its own weight. In contrast, with the three-dimensional printing device 10 of the present preferred embodiment, the direction in which the resin material is discharged is able to be made equal to the direction in which the projecting portion 98 to be printed is projecting, as shown in FIG. 8. Therefore, it is possible to print the projecting portion 98 without having to print a support member that supports the projecting portion 98. That is, it is possible to eliminate the support member for supporting the projecting portion 98.

With the three-dimensional printing device 10, as opposed to a conventional three-dimensional printing device which successively deposits layers of a resin material only in one direction, it is possible to change the direction in which the resin material is deposited by tilting the stage 50. In the example shown in FIG. 8, for example, the body portion 97 is formed by the resin material which is deposited in the direction vertical to the stage 50, whereas the projecting portion 98 is formed by the resin material which is deposited in the direction parallel to the stage 50. Thus, with the three-dimensional printing device 10, it is possible to print a three-dimensional printed object including resin material portions that are deposited in different directions.

As described above, with the three-dimensional printing device 10, the stage moving mechanism 60 moves the stage 50 with six degrees of freedom as shown in FIG. 1. The stage 50 can not only translate in the X-axis direction, the Y-axis direction and the Z-axis direction, but also rotate about the X axis, the Y axis and the Z axis. Therefore, when printing a three-dimensional printed object, it is possible to move the stage 50 to an intended position and to set the stage 50 in an intended attitude. For example, the stage 50 is able to be set in an attitude tilted with respect to the printing head 40. Therefore, it is possible to print, without using a support member, a portion where the resin material cannot be deposited by a conventional three-dimensional printing device without using a support member, e.g., a portion that is projecting in the horizontal direction. As a result, it is possible to reduce the amount of support members to be used when printing a three-dimensional printed object, and reduce the number of steps for removing support members.

The printing head 40 is fixed on the holder 30 disposed above the first base 22, and the printing head 40 is set unmovable. Since no space is needed to allow for the movement of the printing head 40, the three-dimensional printing device 10 is much more compact. Moreover, since cables, and the like, attached to the printing head 40 are not moved during the printing process, for example, the cables, and the like, will not interfere with other members. This allows for cables to be fixed to the base, or the like, with a fixed length, eliminating the need to provide a cover member for bundling together the cables.

With the three-dimensional printing device 10 of the present preferred embodiment, the tank 80 is disposed above the base 20 as shown in FIG. 1. Therefore, as compared with a case where the tank 80 is disposed on the side of the base 20, it is possible to reduce the width of the three-dimensional printing device 10. Thus, the three-dimensional printing device 10 has a more compact structure. With a three-dimensional printing device where the printing head 40 is movable, there is a need to provide a space around the printing head 40 to allow for the movement of the printing head 40, and it is difficult to dispose the tank 80 above the base 20. With the three-dimensional printing device 10 of the present preferred embodiment, however, since the printing head 40 is set unmovable, it is easy to dispose the tank 80 above the base 20, thus slimming the three-dimensional printing device 10. Since the tank 80 is disposed above the second base 26, together with the printing head 40, it is possible to shorten the distance between the printing head 40 and the tank 80, and to thus shorten the resin supply passageway 82. This simplifies the structure of the resin supply passageway 82 and also reduces the flow resistance of the resin through the resin supply passageway 82, resulting in desirably supplying the resin from the tank 80 to the printing head 40. Moreover, the resin tends not to clog inside the resin supply passageway 82.

With the three-dimensional printing device 10 of the present preferred embodiment, the stage moving mechanism 60 is a six-degree-of-freedom parallel link mechanism as shown in FIG. 1. That is, the stage moving mechanism 60 includes the first to sixth guide portions 64, which are able to be moved up and down, the first to sixth actuators 65 (see FIG. 2) to move up and down the first to sixth guide portions 64, respectively, and the first to sixth rods 62, each of which has its first end 62A connected to the stage 50 via the first universal joint 63A therebetween and its second end 62B connected to an associated one of the first to sixth guide portions 64 via the second universal joint 63B therebetween. The stage moving mechanism 60 is able to move the stage 50 in the X-axis direction, the Y-axis direction and the Z-axis direction, and rotate the stage 50 about the X axis, the Y axis and the Z axis by appropriately moving the first to sixth guide portions 64 up and down. This allows for a reduction in the actuator output as compared with a stage moving mechanism that uses, in combination, a table with an actuator capable of moving in the X-axis direction, a table with an actuator capable of moving in the Y-axis direction, and a table with an actuator capable of moving in the Z-axis direction. Moreover, since it is possible to use smaller actuators, it is possible to reduce the size of the stage moving mechanism 60.

With the three-dimensional printing device 10, since the printing head 40 is set unmovable, as described above, there is no need to provide a space above the base 20 to allow for the movement of the printing head 40. Thus, the space above the base 20 is effectively utilized as a space for installing other components. By installing other components above the base 20, it is possible to reduce the width of the three-dimensional printing device 10 and to make the three-dimensional printing device 10 more compact, as compared with a case where other components are disposed on the side of the base 20. The three-dimensional printing device 10 of the present preferred embodiment includes the circuit board 86 electrically connected to the first to sixth actuators 65 as shown in FIG. 1. Since the circuit board 86 is disposed above the second base 26, the three-dimensional printing device 10 has a more compact structure. Since the power source box 88 is disposed above the second base 26, the three-dimensional printing device 10 has a more compact structure.

With the three-dimensional printing device 10 of the present preferred embodiment, the printing head 40 includes the heater 46 as shown in FIG. 2. If the printing head 40 were movable, the heater would move together with the printing head 40. With the three-dimensional printing device 10 of the present preferred embodiment, however, the printing head 40 is set unmovable. This simplifies the wiring of the heater 46, etc., and increases the degree of freedom in the layout of the heater 46, as compared with a case where the heater 46 is moved together with the printing head 40.

With the three-dimensional printing device 10 of the present preferred embodiment, the printing head 40 is fixed on the holder 30 disposed on the second base 26 as shown in FIG. 3. Therefore, there is no need for cables, and the like, to be attached to the printing head 40, and the three-dimensional printing device 10 has a more compact structure. The nozzle 42 and the opening 27 overlap each other as seen from above. Therefore, it is possible to supply the resin material onto the stage 50 without being obstructed by the second base 26.

With the three-dimensional printing device 10 of the present preferred embodiment, there are a plurality of cone-shaped projections 52 provided on the stage 50 as shown in FIG. 5. Since the resin material is held by the projections 52, it is possible to prevent the resin material from slipping on the stage 50 when the stage 50 is tilted.

With the three-dimensional printing device 10 of the present preferred embodiment, the interval d between vertexes 52T of projections 52 provided on the stage 50 is less than or equal to the length D1 of the long side 44L (see FIG. 4) of the discharge port 44 of the nozzle 42, as shown in FIG. 6. Therefore, when the resin material is discharged from the nozzle 42 onto the stage 50, the resin material comes into contact with the vertexes 52T of the projections 52, thus reliably securing the resin material on the stage 50.

Figure 9:
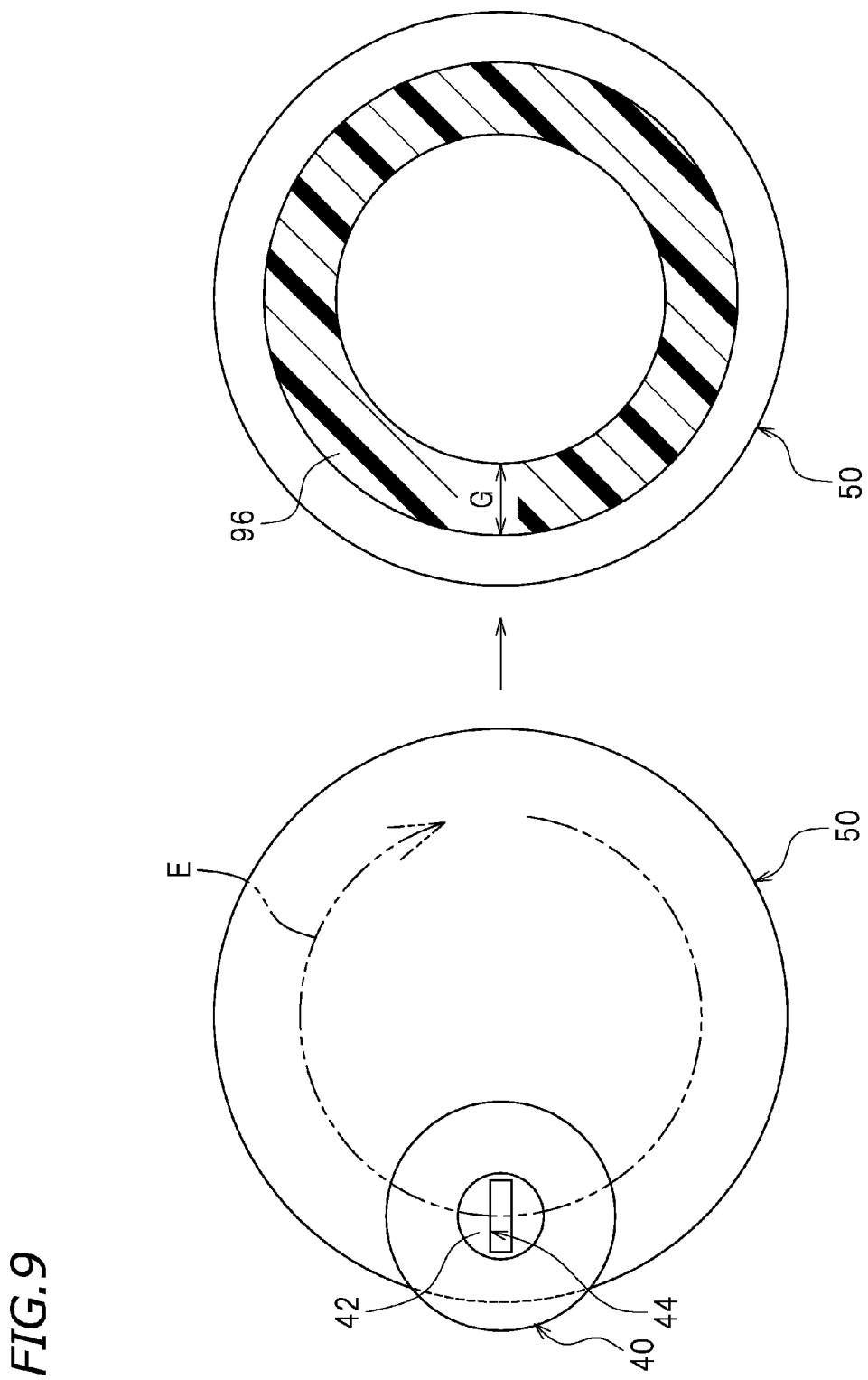
FIG. 9 is a schematic diagram showing an open-ring-shaped printed object being printed on the stage according to a preferred embodiment of the present invention.

With the three-dimensional printing device 10 of the present preferred embodiment, the stage moving mechanism 60 is able to move the stage 50 with six degrees of freedom. The stage moving mechanism 60 is able to rotate the stage 50 about the Z axis. In other words, the stage moving mechanism 60 is able to make the stage 50 rotate on its axis parallel to the Z axis. Even a stage moving mechanism that is unable to rotate the stage 50 about the Z axis is able to make the stage 50 revolve around the Z axis by using translating movements in the X-axis direction and those in the Y-axis direction in combination with each other. In this case, if the discharge port 44 of the printing head 40 is circular, it is possible to supply the resin material in a ring-shaped pattern centered about the Z axis by revolving the stage 50 around the Z axis. However, where the discharge port 44 of the printing head 40 is oblong, if the stage 50 is merely revolved around the Z axis, the width of the resin material on an X-Y plane will not be constant, failing to supply the resin material in a ring-shaped pattern centered about the Z axis. In contrast, with the three-dimensional printing device 10 of the present preferred embodiment, the stage 50 is able to be rotated about the Z axis. Therefore, even where the printing head 40 having an oblong discharge port 44 is fixed on the holder 30, as shown in FIG. 9, it is possible to print an open-ring-shaped three-dimensional printed object 96 having a constant width G by rotating the stage 50 in the direction of arrow E of FIG. 9.

Second Preferred Embodiment

Figure 10:
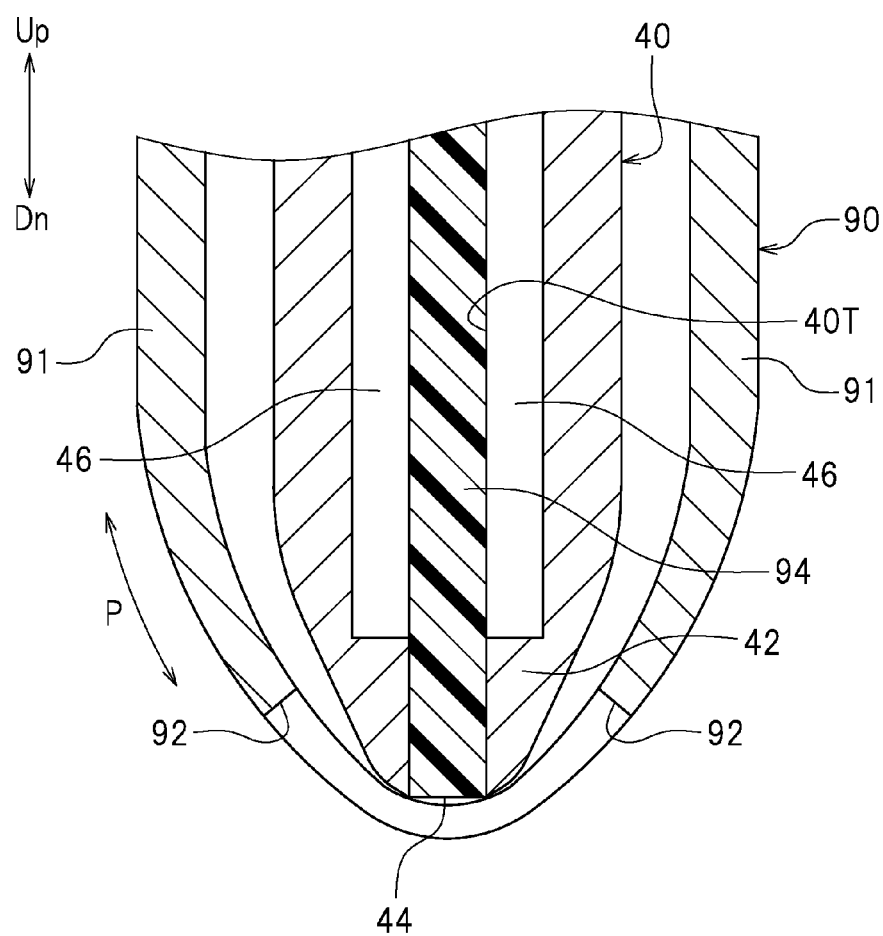
FIG. 10 is a cross-sectional view showing a structure of a printing head and a plate-shaped member according to a preferred embodiment of the present invention.
Figure 11:
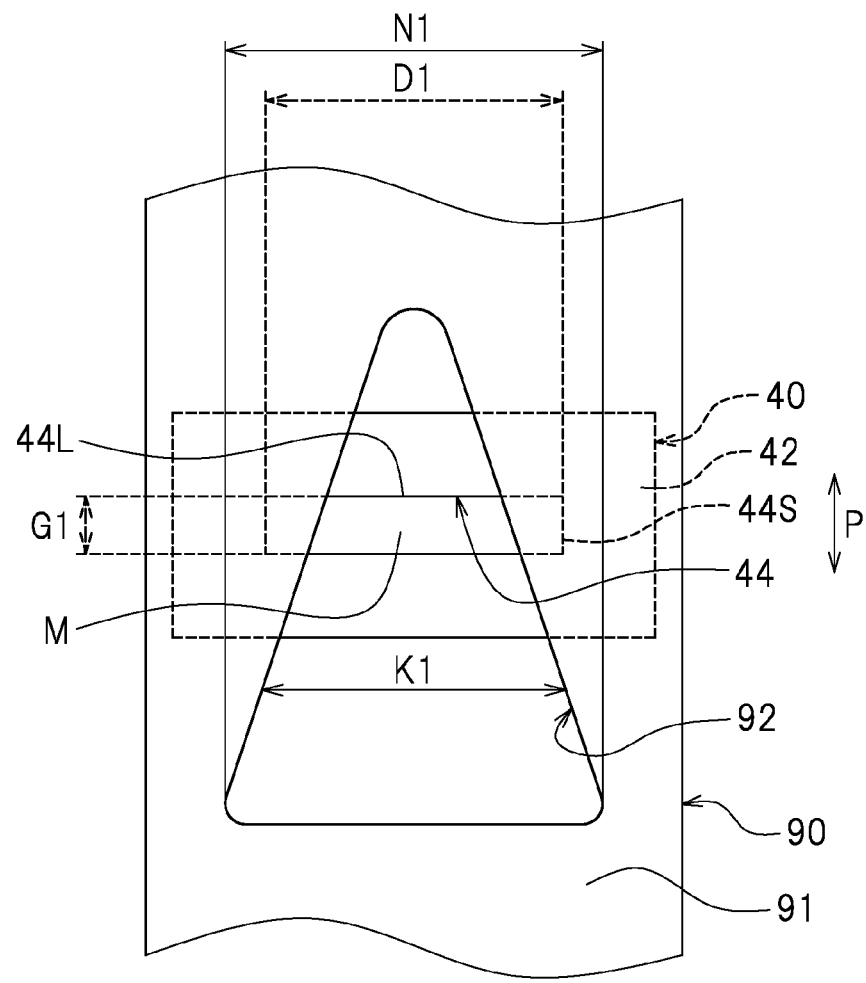
FIG. 11 is a schematic diagram showing a positional relationship between a discharge port of a nozzle and an opening of the plate-shaped member according to a preferred embodiment of the present invention.

FIG. 10 is a cross-sectional view showing a structure of the printing head 40 and a plate-shaped member 90 according to a second preferred embodiment of the present invention. FIG. 11 is a schematic diagram showing a positional relationship between the discharge port 44 of the nozzle 42 and an opening 92 of the plate-shaped member 90 according to the second preferred embodiment. FIG. 11 shows the plate-shaped member 90 before it is bent, for the purpose of illustration.

As shown in FIG. 10, the three-dimensional printing device according to the second preferred embodiment includes the plate-shaped member 90 disposed under the discharge port 44 of the nozzle 42. The plate-shaped member 90 is bent and disposed so as to cover the printing head 40. As shown in FIG. 11, the plate-shaped member 90 extends in a direction crossing the long side 44L of the discharge port 44. The plate-shaped member 90 includes a body portion 91 extending in a direction crossing the long side 44L of the discharge port 44. The body portion 91 of the plate-shaped member 90 has the opening 92 overlapping the discharge port 44. The opening length K1 of the opening 92 along the long side 44L of the discharge port 44 of the nozzle 42 varies between at least two positions in the direction along the short side 44S of the discharge port 44. In the present preferred embodiment, the opening 92 is triangular or substantially triangular. The length N1 that is the maximum opening length K1 of the opening 92 is greater than or equal to the length D1 of the long side 44L of the discharge port 44. The plate-shaped member 90 is configured to be movable in a direction crossing the long side 44L of the discharge port 44, i.e., in the direction of arrow P of FIG. 10 and arrow P of FIG. 11. As the plate-shaped member 90 moves in the direction of arrow P of FIG. 10 and arrow P of FIG. 11, the area over which the discharge port 44 and the opening 92 overlap each other (the area denoted by the reference sign M in FIG. 11) varies. The overlap area M between the discharge port 44 and the opening 92 varies continuously. In the present preferred embodiment, the discharge port 44 is capable of varying the opening area M. The plate-shaped member 90 is able to be moved in the direction of arrow P of FIG. 10 by using a known driving source, such as a motor, for example.

Figure 12:
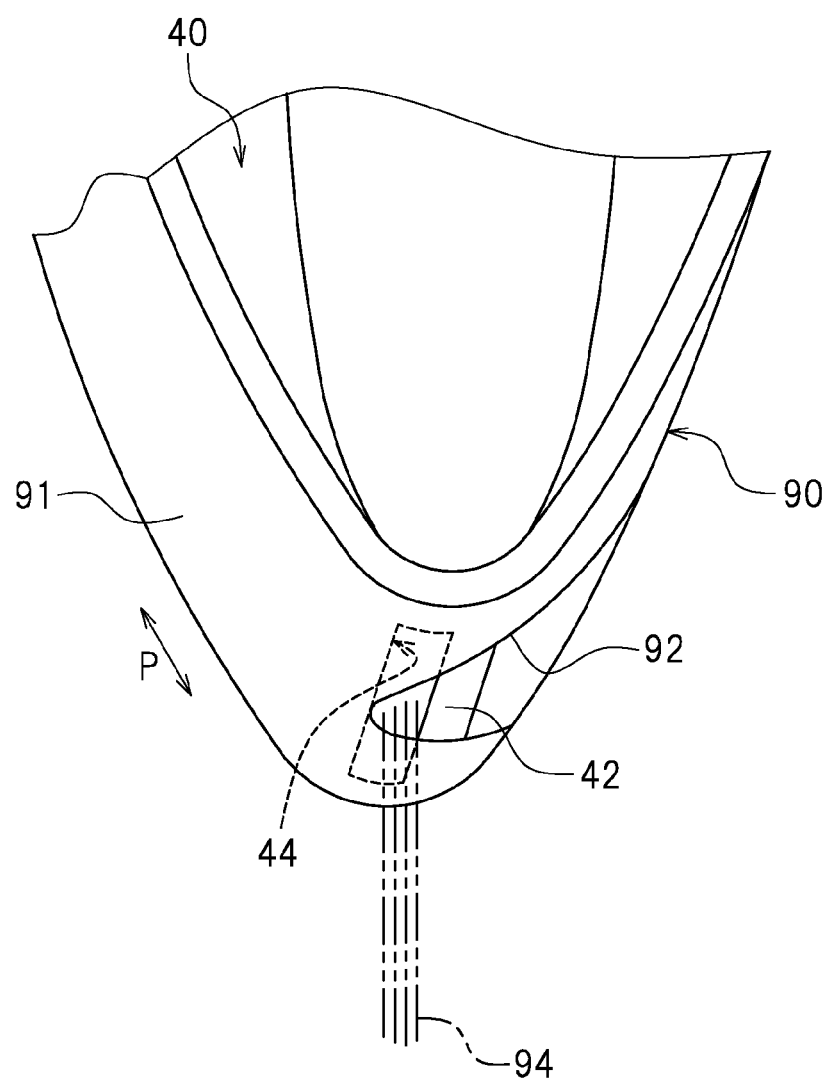
FIG. 12 is a perspective view showing a structure of the printing head and the plate-shaped member according to a preferred embodiment of the present invention.

As shown in FIG. 12, when the plate-shaped member 90 moves in the direction of arrow P and the discharge port 44 and the opening 92 overlap each other, a portion of the discharge port 44 is exposed. Then, the resin material 94 supplied from the tank 80 (see FIG. 1) is discharged from the portion of the discharge port 44 onto the stage 50.

Figure 13:
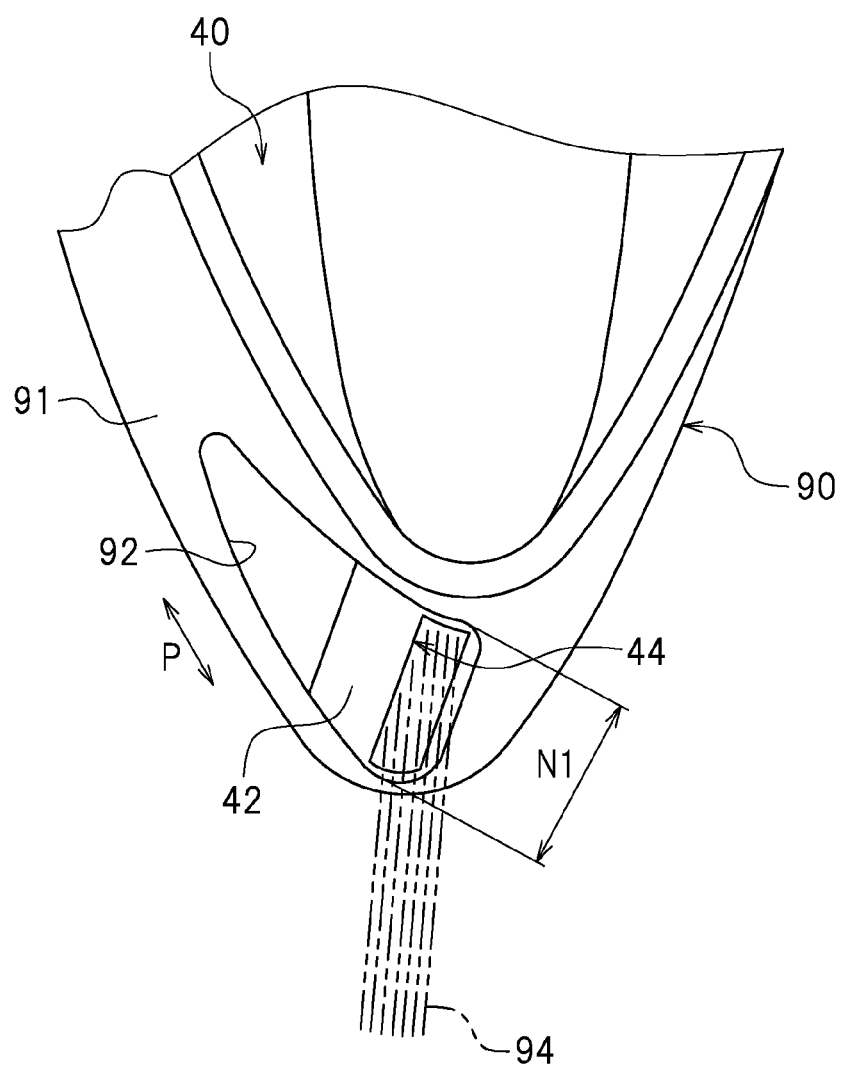
FIG. 13 is a perspective view showing a structure of the printing head and the plate-shaped member according to a preferred embodiment of the present invention.

As shown in FIG. 13, when the plate-shaped member 90 moves in the direction of arrow P and the discharge port 44 overlaps a portion of the opening 92 that has the length N1, the discharge port 44 is exposed entirely. Then, the resin material 94 supplied from the tank 80 (see FIG. 1) is discharged from the entire discharge port 44 onto the stage 50.

Figure 14:
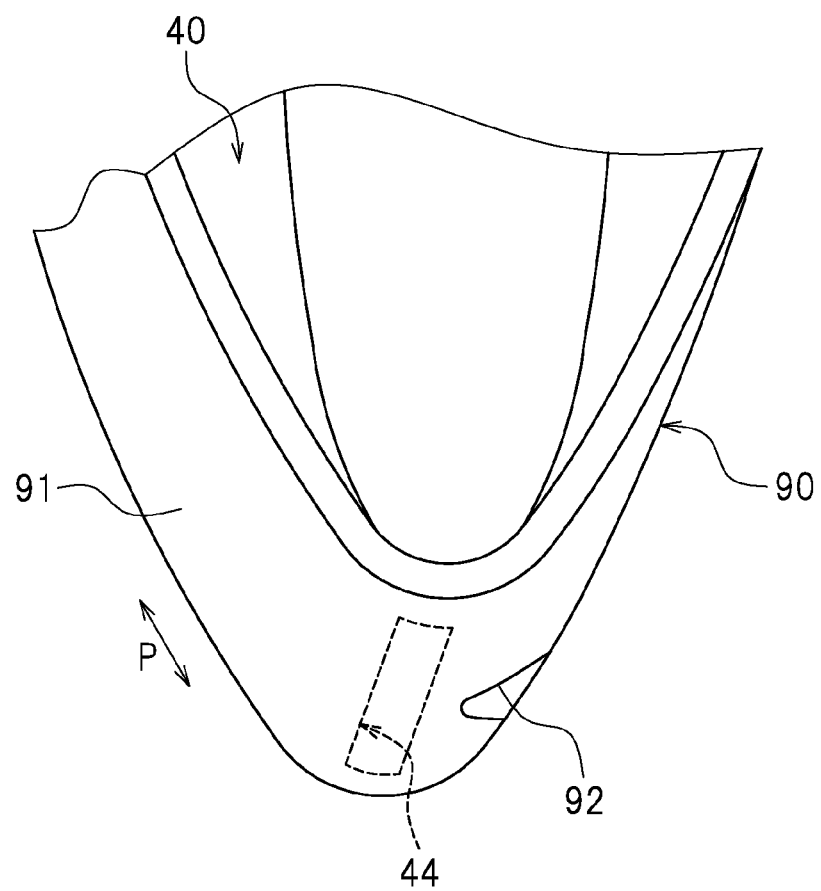
FIG. 14 is a perspective view showing a structure of the printing head and the plate-shaped member according to a preferred embodiment of the present invention.

As shown in FIG. 14, the plate-shaped member 90 moves in the direction of arrow P and the body portion 91 of the plate-shaped member 90 (the portion excluding the opening 92) entirely covers the discharge port 44, the discharge port 44 is not exposed. Then, the resin material 94 supplied from the tank 80 (see FIG. 1) is no longer discharged from the discharge port 44 onto the stage 50.

With the three-dimensional printing device 10 of the present preferred embodiment, the discharge port 44 of the nozzle 42 is configured so that the opening area M thereof is able to be varied, as shown in FIG. 10. Therefore, since the amount of the resin material discharged from the nozzle 42 is able to be varied, the amount of the resin material discharge is reduced by reducing the opening area of the discharge port 44 when printing fine portions, thus making it possible to print a three-dimensional printed object with a higher precision. On the other hand, for portions that require a large amount of the resin material, it is possible to enlarge the opening area of the discharge port 44 so as to discharge a large amount of the resin material in a single shot, thus improving the printing speed.

With the present preferred embodiment, the opening area of the discharge port 44 is variable, whereas the opening width of the discharge port 44 is constant. That is, where the length of the discharge port 44 along its long side 44L and the length thereof along its short side 44S are denoted as the "opening length" and the "opening width", respectively, the discharge port 44 is configured so that the opening length thereof is varied while the opening width G1 is kept constant. In other words, the discharge port 44 is configured so that the opening area thereof is variable while the opening width G1 is kept constant. When the stage 50 is moved, relative to the nozzle 42, in the direction of the short side 44S of the discharge port 44 (the direction of the opening width, or the direction of arrow P of FIG. 11, etc.), since the length of the discharge port 44 in that direction (i.e., the opening width G1) is constant, the thickness of a resin layer (the length of the resin layer in the up-down direction) to be newly deposited on the stage 50 or on an already-cured resin layer is constant.

Figure 15A:
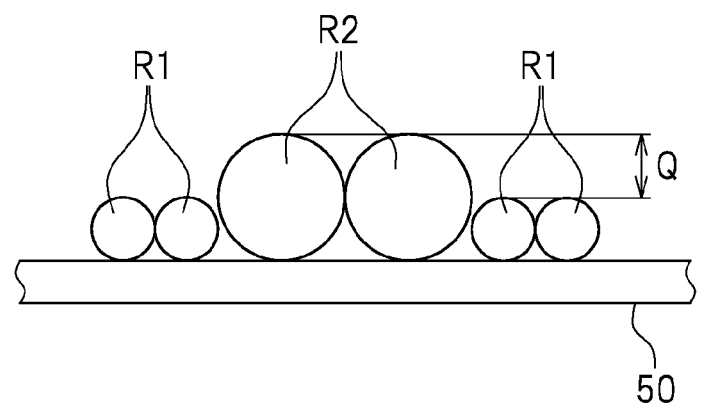
FIG. 15A is a diagram illustrating a resin material discharged from a discharge port of a nozzle whose opening width is variable.
Figure 15B:
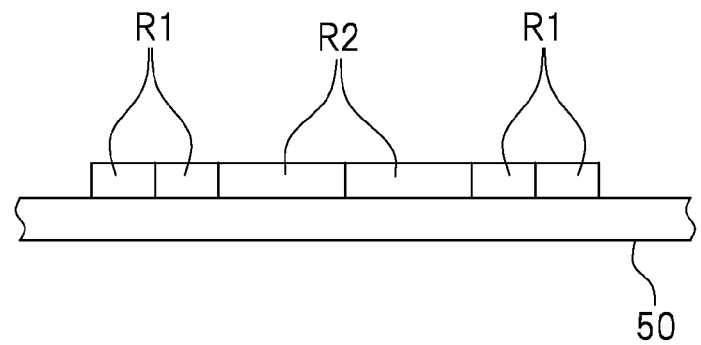
FIG. 15B is a diagram illustrating a resin material discharged from a discharge port of a nozzle whose opening width is fixed.

For example, where the discharge port 44 is a circular opening whose opening area can be varied, the opening width also varies when the opening area is varied. In this case, as shown in FIG. 15A, a resin R1 discharged when the opening area is small and a resin R2 discharged when the opening area is large have different thicknesses, resulting in a step Q. With the present preferred embodiment, however, since the opening width G1 is constant, a resin R1 discharged when the opening area is small and a resin R2 discharged when the opening area is large have the same thickness even though the amount of resin differs therebetween, as shown in FIG. 15B. Thus, since there is no step between the resin R1 and the resin R2, it is possible to deposit resin materials with a high precision. Therefore, with the present preferred embodiment, it is possible to print a three-dimensional printed object with a high precision.

With the three-dimensional printing device 10 of the present preferred embodiment, the discharge port 44 is rectangular or substantially rectangular as shown in FIG. 11. Since the opening width G1 of the discharge port 44 is constant, the thickness of the resin material discharged onto the stage 50 is constant. Moreover, the plate-shaped member 90 has the triangular or substantially triangular opening 92 overlapping the discharge port 44 of the nozzle 42. The plate-shaped member 90 is configured so as to move in a direction crossing the long side 44L of the discharge port 44 to vary the area M over which the discharge port 44 and the opening 92 overlap each other. Thus, since the amount of the resin material discharged from the nozzle 42 is able to be varied, it is possible to print a three-dimensional printed object with a higher precision.

The three-dimensional printing device 10 of the present preferred embodiment is configured so that the body portion 91 of the plate-shaped member 90 is able to entirely cover the discharge port 44, as shown in FIG. 14. Thus, it is possible to stop discharging the resin material onto the stage 50 (see FIG. 1) without stopping the supply of the resin material.

Third Preferred Embodiment

Figure 16:
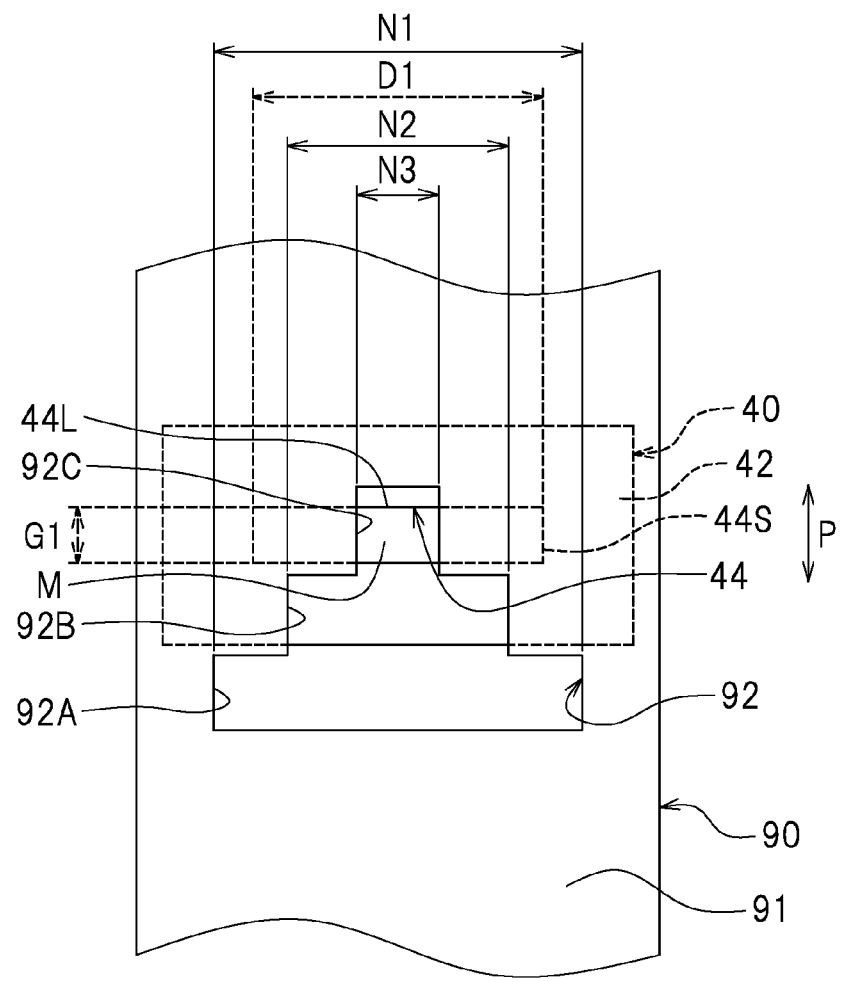
FIG. 16 is a schematic diagram showing a positional relationship between a discharge port of a nozzle and an opening of a plate-shaped member according to a preferred embodiment of the present invention.

FIG. 16 is a schematic diagram showing a positional relationship between the discharge port 44 of the nozzle 42 and the opening 92 of the plate-shaped member 90 according to a third preferred embodiment of the present invention. FIG. 16 shows the plate-shaped member 90 before it is bent, for the purpose of illustration.

As shown in FIG. 16, the opening 92 includes a first opening 92A having an opening length of N1, a second opening 92B having an opening length of N2, and a third opening 92C having an opening length of N3, along the long side 44L of the discharge port 44 of the nozzle 42. The first opening 92A, the second opening 92B and the third opening 92C are arranged in the direction of the short side 44S of the discharge port 44. The opening width of each of the first to third openings 92A to 92C is greater than or equal to the opening width G1 of the discharge port 44. The plate-shaped member 90 is configured so as to move in a direction crossing the long side 44L of the discharge port 44, i.e., in the direction of arrow P of FIG. 16. As the plate-shaped member 90 moves in the direction of arrow P of FIG. 16, the area over which the discharge port 44 and the opening 92 overlap each other (the area denoted by the reference sign M in FIG. 16) is varied. The area M over which the discharge port 44 and the opening 92 overlap each other is varied stepwise. While the opening 92 includes the first to third openings 92A to 92C having different opening lengths, the present invention is not limited thereto. The opening 92 may include two openings having different opening lengths, or four or more openings having different opening lengths.

Fourth Preferred Embodiment

Figure 17:
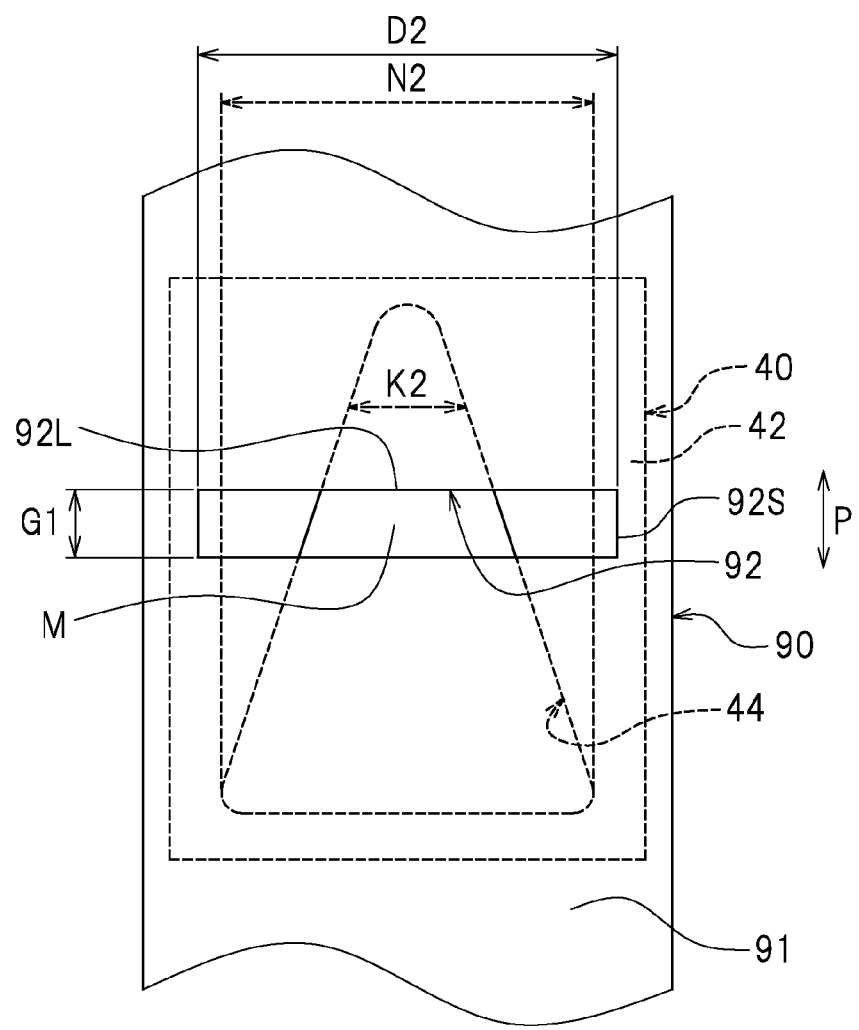
FIG. 17 is a schematic diagram showing a positional relationship between a discharge port of a nozzle and an opening of a plate-shaped member according to a preferred embodiment of the present invention.

FIG. 17 is a schematic diagram showing a positional relationship between the discharge port 44 of the nozzle 42 and the opening 92 of the plate-shaped member 90 according to a fourth preferred embodiment of the present invention. FIG. 17 shows the plate-shaped member 90 before it is bent, for the purpose of illustration.

As shown in FIG. 17, the nozzle 42 has the discharge port 44 that discharges a resin material. The discharge port 44 has an opening facing downward. The opening length K2 of the discharge port 44 along a long side 92L of the opening 92 of the plate-shaped member 90 varies along a short side 92S of the opening 92. In the present preferred embodiment, the discharge port 44 is triangular or substantially triangular.

As shown in FIG. 17, the plate-shaped member 90 of the fourth preferred embodiment includes the body portion 91. The body portion 91 of the plate-shaped member 90 has the opening 92 overlapping the discharge port 44. The opening 92 is rectangular or substantially rectangular, and has the long side 92L and the short side 92S. Where the length of the long side 92L of the opening 92 is D2, the length N2 that is the maximum opening length K2 of the discharge port 44 is greater than or equal to the length D2 of the long side 92L of the opening 92. The plate-shaped member 90 is configured to be movable in a direction crossing the long side 92L of the opening 92, i.e., along arrow P of FIG. 17. As the plate-shaped member 90 moves in the direction of arrow P of FIG. 17, the area over which the discharge port 44 and the opening 92 overlap each other (the area denoted by the reference sign M in FIG. 17) is varied. The overlap area M between the discharge port 44 and the opening 92 varies continuously.

With the three-dimensional printing device 10 of the present preferred embodiment, the plate-shaped member 90 has the rectangular or substantially rectangular opening 92 overlapping with the discharge port 44 of the nozzle 42, as shown in FIG. 17. The plate-shaped member 90 is configured so as to move in a direction crossing the long side 92L of the opening 92 to vary the area M over which the discharge port 44 and the opening 92 overlap each other. Thus, since the amount of the resin material discharged from the nozzle 42 is able to be varied, it is possible to print a three-dimensional printed object with a higher precision.

The three-dimensional printing device 10 of the present preferred embodiment is configured so that the body portion 91 of the plate-shaped member 90 is able to entirely cover the discharge port 44, as shown in FIG. 17. Thus, it is possible to stop discharging the resin material onto the stage 50 (see FIG. 1) without stopping the supply of the resin material.

Various preferred embodiments of the present invention have been described above. However, the preferred embodiments described above are merely illustrative, and the present invention can be carried out in various other preferred embodiments.

While the diameter of the first base 22 and the diameter of the second base 26 preferably are equal or substantially equal to each other in the first preferred embodiment described above, the diameter of the second base 26 may be greater than or less than the diameter of the first base 22. The shape of the first base 22 and the second base 26 is not limited to a disc shape, but may be rectangular or substantially rectangular, elliptical or substantially elliptical, trapezoidal or substantially trapezoidal, circular or substantially circular, or the like.

While the opening 27 preferably is surrounded by the second base 26 in the first preferred embodiment described above, the opening 27 may be a cut-out such that the opening 27 is not entirely surrounded by the second base 26.

While there are a plurality of cone-shaped projections 52 provided on the stage 50 in the first preferred embodiment described above, a layer on which the resin material easily gets stuck may be provided on the surface of the stage 50, instead of forming the projections 52. Alternatively, the surface of the stage 50 may be machined into a rough surface with surface irregularities through a sandblasting process, or the like.

While the opening 92 of the plate-shaped member 90 is triangular or substantially triangular in the second preferred embodiment described above, it may be elliptical or oval, for example. The opening 92 may define a plurality of openings having different opening areas or different opening shapes.

While the discharge port 44 of the nozzle 42 is triangular or substantially triangular in the fourth preferred embodiment described above, it may be elliptical or oval, for example. The discharge port 44 may define a plurality of openings having different opening areas or different opening shapes.

While the stage moving mechanism 60 preferably is a six-degree-of-freedom parallel link mechanism in the preferred embodiments described above, the present invention is not limited thereto. For example, the stage moving mechanism 60 may be a combination of an X stage capable of translating in the X-axis direction and rotating about the X axis, a Y stage capable of translating in the Y-axis direction and rotating about the Y axis, and a Z stage capable of translating in the Z-axis direction and rotating about the Z axis.

While the stage moving mechanism 60 moves the stage 50 preferably with six degrees of freedom in the preferred embodiments described above, the present invention is not limited thereto. The stage moving mechanism 60 may move the stage 50 with five degrees of freedom. That is, the stage moving mechanism 60 is configured to translate the stage 50 in the X-axis direction, the Y-axis direction and the Z-axis direction, and to rotate the stage 50 about the X axis and the Y axis.

While the guide portions 64 are moved up and down preferably by the actuators 65 rotating the ball screws 66 in the preferred embodiments described above. However, there is no particular limitation on the mechanism to move the guide portions 64 up and down. For example, each guide portion 64 may include a gear to be driven by a motor, and each post 24 may include a plurality of teeth to mesh with the gear. Alternatively, a pulley may be provided at the upper end and the lower end of each post, with a transmission belt wound around the pulleys, and the corresponding guide portion 64 may be fixed to a portion of the transmission belt. In this case, a motor may be connected to one of the pulleys. Alternatively, rotation link mechanisms may be used instead of the actuators 65.

While the tank 80 is disposed above the base 20 in the preferred embodiments described above, the present invention is not limited thereto. For example, the tank 80 may be disposed on the side of the base 20. Alternatively, the tank 80 may be disposed on the base 20, or may be disposed in a cut-out made in a portion of the base 20.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A three-dimensional printing device for printing a three-dimensional printed object by curing a resin material so as to successively deposit layers of resin each having a predetermined cross-sectional shape, the three-dimensional printing device comprising:
   a base;
   a holder disposed above the base;
   a printing head fixed on the holder and including a nozzle configured to discharge the resin material;
   a stage disposed below the printing head and movably supported on the base, the stage being configured to hold the resin material discharged from the nozzle; and
   a stage moving mechanism configured to move the stage with six degrees of freedom, wherein
   the stage moving mechanism includes:
   first to sixth posts extending in an up-down direction;
   first to sixth guide portions configured to move up and down along the first to sixth posts, respectively;
   first to sixth actuators configured to move up and down the first to sixth guide portions, respectively; and
   first to sixth rods each of which has a fixed length and includes a first end portion connected to the stage via a first universal joint therebetween and a second end portion connected to an associated one of the first to sixth guide portions via a second universal joint therebetween.

2. The three-dimensional printing device according to claim 1, further comprising:
   a tank disposed above the base and configured to contain the resin material therein; and
   a resin supply passageway connected to the tank and the printing head.

3. The three-dimensional printing device according to claim 1, further comprising a circuit board disposed above the base and electrically connected to the first to sixth actuators.

4. The three-dimensional printing device according to claim 1, wherein:
   the resin material is a thermoplastic resin; and the printing head includes a heater configured to heat the thermoplastic resin.

5. The three-dimensional printing device according to claim 1, wherein:
the base includes a first base, the first to sixth posts extending upward from the first base, and a second base supported by the first to sixth posts and disposed above the first base, the second base including an opening therein;
the holder disposed on the second base; and
the nozzle overlaps the opening as seen from above.

6. The three-dimensional printing device according to claim 1, wherein:
the nozzle includes a discharge port that discharges the resin material; and
an opening area of the discharge port is variable.

7. The three-dimensional printing device according to claim 6, wherein:
an opening width of the discharge port, which represents a length in an up-down direction of the resin material discharged from the discharge port, is constant; and
when the nozzle discharges the resin material, the stage moving mechanism moves the stage relative to the nozzle in a direction of the opening width of the discharge port.

8. The three-dimensional printing device according to claim 6, further comprising:
a plate-shaped member disposed under the discharge port, wherein:
the discharge port is rectangular or substantially rectangular;
the plate-shaped member includes an opening overlapping the discharge port, wherein an opening length of the opening along a long side of the discharge port varies between at least two positions in a direction along a short side of the discharge port; and
the plate-shaped member is configured so as to move in a direction crossing the long side of the discharge port to vary an area over which the discharge port and the opening overlap each other.

9. The three-dimensional printing device according to claim 8, wherein the opening is triangular or substantially triangular.

10. The three-dimensional printing device according to claim 8, wherein the plate-shaped member is configured so as to move in a direction crossing the long side of the discharge port so that a portion of the plate-shaped member excluding the opening entirely covers the discharge port.

11. The three-dimensional printing device according to claim 6, further comprising:
a plate-shaped member disposed under the discharge port, wherein:
the plate-shaped member includes a rectangular or substantially rectangular opening overlapping with the discharge port;
an opening length of the discharge port along a long side of the opening varies between at least two positions in a direction along a short side of the opening; and
the plate-shaped member is configured so as to move in a direction crossing the long side of the opening to vary an area over which the discharge port and the opening overlap each other.

12. The three-dimensional printing device according to claim 11, wherein the discharge port is triangular or substantially triangular.

13. The three-dimensional printing device according to claim 11, wherein the plate-shaped member is configured so as to move in a direction crossing the long side of the opening so that a portion of the plate-shaped member excluding the opening entirely covers the discharge port.

14. The three-dimensional printing device according to claim 6, wherein there are a plurality of projections provided on the stage.

15. The three-dimensional printing device according to claim 14, wherein:
the projections are each cone-shaped; and
an interval between vertexes of the projections is less than or equal to a length of a long side of the discharge port or a length of a long side of the opening.

16. The three-dimensional printing device according to claim 1, wherein the first to sixth actuators are provided with the first to sixth posts, respectively.

17. The three-dimensional printing device according to claim 16, wherein:
the first to sixth posts are provided with a groove extending in the up-down direction, respectively;
first to sixth ball screws extending in the up-down direction are disposed in the groove and inserted in the first to sixth guide portions, respectively; and
the first to sixth actuators are disposed at an upper end of the first to sixth ball screws, respectively.

* * * * *